(No Model.)
W. H. & F. A. WINSLOW.
LIBRARY SHELVING.
No. 569,270. Patented Oct. 13, 1896.
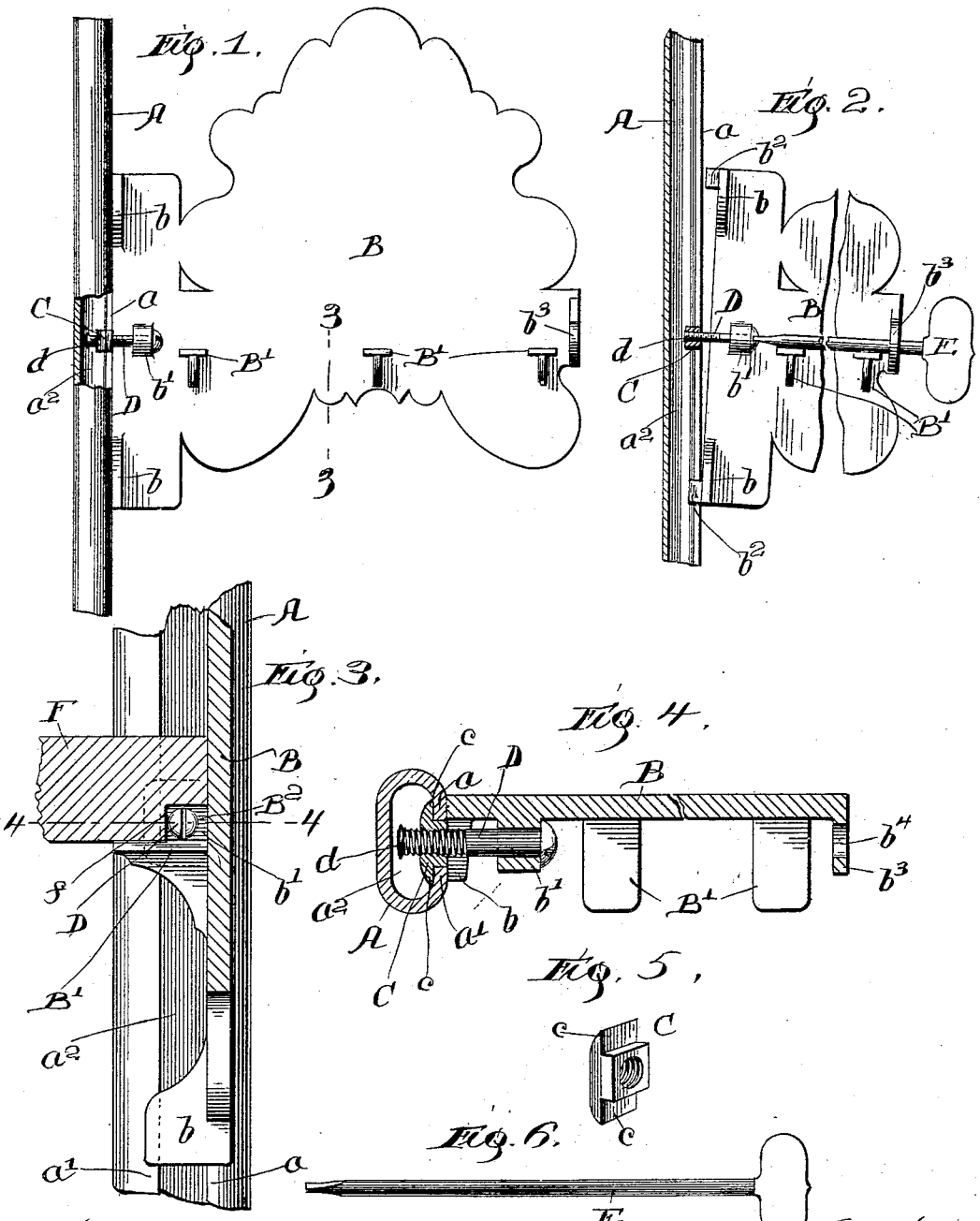
Witnesses:
Chas O Survey
M. L. Sheahan
Inventors
William H Winslow and
Francis A. Winslow,
by Wilkinson & Fisher
attys

UNITED STATES PATENT OFFICE.

WILLIAM H. WINSLOW AND FRANCIS A. WINSLOW, OF CHICAGO, ILLINOIS.

LIBRARY-SHELVING.

SPECIFICATION forming part of Letters Patent No. 569,270, dated October 13, 1896.

Application filed January 29, 1896. Serial No. 577,247. (No model.)

*To all whom it may concern:*

Be it known that we, WILLIAM H. WINSLOW and FRANCIS A. WINSLOW, citizens of the United States of America, residing at Chicago, in the county of Cook and State of Illinois, have invented certain new and useful Improvements in Library-Shelving, of which the following is a specification.

Our invention relates to certain improvements in library-shelving; and it consists in certain novel features of construction, which will be fully described in this specification and particularly pointed out in the appended claims.

The invention is illustrated in the drawings presented herewith, of which—

Figure 1 is a side elevation of an upright and bracket, a portion of the upright being broken away. Fig. 2 is a similar view, but showing the bracket in a different position and partly broken away. Fig. 3 is a vertical cross-section on line 3 3 of Fig. 1 upon a larger scale. Fig. 4 is a horizontal longitudinal section on line 4 4 of Fig. 3. Fig. 5 is a perspective view of a clamping-nut, and Fig. 6 is a side view of an operating-key used in the adjustment of the brackets.

In the drawings, A is an upright supported in any suitable manner and preferably constructed of channel-iron, having its edges bent toward each other, so as to form overhanging edges $a$ $a'$ and groove $a^2$, as seen in Fig. 4. This style of channel-iron has been adopted on account of its simplicity of construction, but it is obvious that various shapes may be used, the important feature being that it have suitable overhanging edges and a slot for receiving the clamping device hereinafter described.

The bracket is shown at B as consisting of a plate provided with a suitable ornamental face, and having shoulders $b$ $b$ extending at right angles therefrom and forming a slide or bearing surface resting against the faces of the overhanging edges. The means for clamping the bracket to the upright consist of an internally-screw-threaded clamping-nut C, provided with shoulders $c$ $c$, (see Fig. 5,) resting against the inner faces of the overhanging edges, said nut being of a size small enough to pass between the overhanging edges when given a quarter-turn from its normal position, that is, its clamped position. An adjusting-screw D is mounted in a lug $b'$, extending from the bracket B, and this screw is connected with the clamping-nut C. The screw D is headed after it has been passed through the nut, (see Fig. 4 at $d$,) so that said screw may be loosened until the head $d$ strikes the nut C and clamps the nut to the screw. The nut is held between the overhanging edges, which prevents its rotation when any adjustment of the screw takes place, except when it is desired to turn the nut in order to remove the bracket from the upright. The screw is provided with a suitable head, so that it may be turned by means of an operating-key E. When said screw is tightened, it crowds the shoulders $c$ $c$ of the nut C against the inner faces of the overhanging edges and clamps the bracket firmly against the upright. Lugs $b^2$ $b^2$ are provided upon the shoulders $b$ $b$ and project into the slot between the edges $a$ $a'$ and prevent any lateral rocking of the bracket B and assist in guiding the same when adjusting it upon the upright.

Upon the forward end of the bracket is a lug $b^3$, having a hole $b^4$, (see Fig. 4,) concentric with the screw D, through which the key E may be inserted when it is desired to adjust the bracket. A series of lugs B' are arranged upon the bracket to support the shelf F, (see Fig. 3,) which is notched out, as seen at $f$, thus forming, together with the wall of the bracket and the lugs B' $b^3$, a channel B², adapted to guide the operating-key E to the screw D when it is desired to adjust the shelves.

The construction shown and described is very simple and economical, and it prevents malicious persons from meddling with the adjustment of the brackets, since the screw or adjusting device is beyond the reach of any one without the proper key. To remove the bracket from the upright, the screw D is loosened until the head $d$ is crowded against the nut, when the bracket will assume the position seen in Fig. 2. The nut is now clamped tightly to the screw D, the bracket swung against the upright, thus drawing the square portion of the nut away from the overhanging edges, when the nut may be given a quarter-turn by means of the operating-key and the bracket withdrawn from the upright, since the nut is so constructed that it will easily pass between the overhanging edges when parallel therewith.

We have described only one upright and bracket, but in the construction of shelving it is obvious that two uprights and brackets are necessary, the shelf lying upon the lugs B', and it is not thought necessary to describe but one set, as that description pertains to both sets.

We have specifically shown and described the invention, but we are aware that various modifications thereof may be made without changing the principle of our invention, and we do not, therefore, desire to limit ourselves, except as particularly pointed out in the following claims.

We claim as new and desire to secure by Letters Patent—

1. The combination with a suitable upright of a bracket adapted to engage therewith having a key-operated fastening device upon the edge of the bracket which engages with the upright, said fastening device having a key-engaging portion adjacent to said edge and suitable guiding devices for guiding a long operating-key from the front edge of the bracket to the fastening device.

2. The combination with a suitable upright of a shelf-bracket adapted to engage therewith having a key-operated fastening device upon the edge of the bracket which engages with the upright, said fastening device having a key-engaging portion adjacent to said edge, and a shelf resting upon the bracket and forming in connection therewith a guiding-channel extending from the fastening device to the opposite edge of the bracket and adapted to receive and guide an operating-key from the front edge of the bracket to the fastening device.

3. The combination with a suitable upright of a shelf-bracket having a rear edge adapted to engage therewith and a suitable clamping device upon said edge, said clamping device being provided with a key-engaging portion adjacent to said edge and a notched shelf resting upon the bracket and forming therewith an open guiding-channel extending from the forward edge of the bracket to the clamping device.

4. The combination in a device of the class described, and with an upright having an undercut groove of a bracket having a short key-operated clamping device for adjustably clamping it to the upright, shelf-supporting lugs upon the bracket and a notched shelf resting upon said lugs, the sides of the notch together with the lugs forming an open guiding-channel for an operating-key.

5. The combination with an upright having an undercut groove, of a supporting-bracket, a nut having suitable shoulders for engagement with the overhanging edges of the upright, means for preventing the rotation of said nut when in a clamped position, a screw connecting said nut with the bracket, whereby the tightening of the screw secures the bracket to the upright, said screw being provided with a head fitted to a corresponding operating-key and a guide extending to the front of the bracket and adapted to guide said key; substantially as described.

6. The combination with an upright having an undercut groove, of a supporting-bracket, a clamping-nut having shoulders adapted to impinge upon the inner faces of the overhanging edges, a screw connecting the bracket with said nut and means for clamping the nut to said screw when desired; substantially as described.

7. The combination with an upright having an undercut groove, of a supporting-bracket, a clamping-nut of a size small enough to pass through the opening between the overhanging edges, but having shoulders when turned at right angles thereto which will engage with the overhanging edges, a screw connecting said nut with the bracket, said screw being headed so that when sufficiently withdrawn the head will strike the nut and clamp the same to the screw; substantially as described.

8. The combination with an upright having an undercut groove, of a bracket having a suitable bearing-surface adapted to slide upon the overhanging edges of the upright and a clamping device consisting substantially of the nut, C, having a square portion adapted to slide in a slot between the overhanging edges, and shoulders adapted to bear against the inner faces of said overhanging edges when turned at right angles thereto, a screw connecting said nut with the bracket and means for clamping said screw to the nut whereby said nut may be withdrawn from said slot when given a quarter-turn; substantially as described.

9. The combination with an upright having the overhanging edges, $a$, $a'$, of the bracket, B, having the guiding-surfaces, $b$, $b$, the clamping device consisting of the nut, C, having the shoulders, $c$, $c$, the lug, $b'$, the screw, D, connecting said lug with the nut and the head, $d$, adapted when the screw is sufficiently withdrawn to clamp the nut thereto; substantially as and for the purpose set forth.

WILLIAM H. WINSLOW.
FRANCIS A. WINSLOW.

Witnesses:
C. M. WEAD,
CHAS. P. SAXE.